June 7, 1932.   J. F. O'MALLEY   1,862,421
STABILIZING DEVICE FOR AIRCRAFT
Filed July 18, 1931   2 Sheets-Sheet 1

WITNESSES

INVENTOR
John F. O'Malley
BY
ATTORNEYS

June 7, 1932.  J. F. O'MALLEY  1,862,421
STABILIZING DEVICE FOR AIRCRAFT
Filed July 18, 1931   2 Sheets-Sheet 2

INVENTOR
John F. O'Malley
BY Munn & Co
ATTORNEYS

WITNESSES
Geo. W. Naylor
Hugh H. Ott

Patented June 7, 1932

1,862,421

UNITED STATES PATENT OFFICE

JOHN F. O'MALLEY, OF NEW YORK, N. Y.

STABILIZING DEVICE FOR AIRCRAFT

Application filed July 18, 1931. Serial No. 551,763.

This invention relates to aircraft, and comprehends a safety device which is adapted to be incorporated in the wing structure airplanes or other heavier-than-air aircraft so as to provide means for optionally obtaining a resistance adapted to assist in correcting the position of the craft, and which is especially useful when descending whereby to negotiate a slower and safer landing and to shorten the essential run after contact with the ground.

More particularly, the invention resides in a device of the indicated character which includes fore and aft shutters constituting sections of the wing structure adjacent the entering and trailing edges of the wing, which are movable in unison from an inactive position forming part of the wing contour to an active position disposed at various angles to the wing surface to obtain the desired result.

As a further object, the invention comprehends in connection with a device of the character set forth, a control means therefor under the direct control of the pilot and by virtue of which the device may be manipulated with the greatest facility.

The invention further resides in a device of the character described which is comparatively simple in its construction and mode of use, which is inexpensive to produce and install and which is highly efficient in its purpose.

With the above recited and other objects in view, reference is had to the following description and acompanying drawings, in which there is exhibited one example or embodiment of the invention, while the claims define the actual scope of the same.

Figure 1:
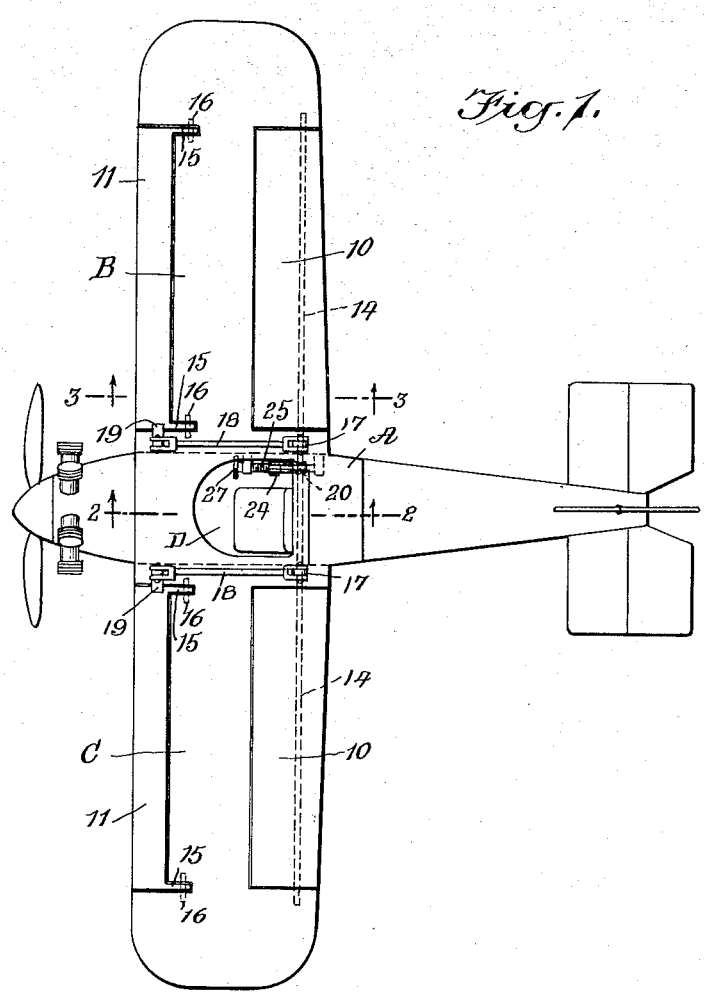
Figure 1 is a plan view of an airplane equipped with a safety device constructed in accordance with the invention and illustrating the same in its normal or inactive position.

Referring to the drawings by characters of reference, A designates the fuselage and B and C the right and left sections of the wing structure disposed on opposite sides of the fuselage and the pilot's compartment D.

The safety device constituting the present invention consists of what will be termed a valve member 10 and a shutter member 11 applied respectively to the trailing edge and entering or leading edge of the right and left sides B and C of the wing structure. As shown, the upper surface of the wing adjacent the trailing edge is recessed as at 12 to accommodate the forward portion of the valve members 10. The upper portion of the wing adjacent the entering or leading edge of each side of the wing is likewise recessed as at 13 to fully accommodate the shutter 11, and said valve members and shutters complete the wing tour. The valve members 10 are secured to a transverse shaft 14 which is journaled for rotatory movement in the wing structure, and which shaft is disposed intermediate the width of the valve members 10 at a point slightly in rear of the recessed portions 12. The shutters 11 are provided with rearwardly extending ears 15 which are fulcrumed as at 16 to the wing structure so that when said shutters are swung upwardly with reference to the wing to what will be termed their active position, the rear edges will be spaced above the upper surface of the wing to permit of the passage of air thereunder. It will also be observed that the valve members 10 are fulcrumed so as to provide a space between the trailing edge of the recessed portion 12 of the wing and the valve member proper, to permit of the passage of air therebetween when moved to their active angular position illustrated in Figure 4. In order to effect the movement of the valve members and shutters in unison, the shaft 14 adjacent the inner side edge of each valve member has secured thereto an upwardly projecting arm 17 which is connected by a link 18 to an upwardly directed arm 19 on the shutter 11.

Obviously, various means for turning the shaft 14 may be employed, but, as illustrated, this means consists of an arm 20 secured to and depending from the shaft 14 adjacent the cockpit D, and links 21 are pivotally connected with the free lower end of the arm 20 and with the upstanding ear 22 on the threaded sleeve 24. A screw shaft 25 journaled for rotation in bearings 26 and held against axial movement extends through the threaded sleeve 24 and is designed upon rotation of the screw in opposite directions to feed the sleeve 24 axially of the screw shaft for effecting turning movement of the shaft 14. A manipulating wheel 27 or its equivalent is located in juxtaposition to the pilot seat in the cockpit D, by virtue of which the screw shaft may be turned to control the device.

Figure 2:
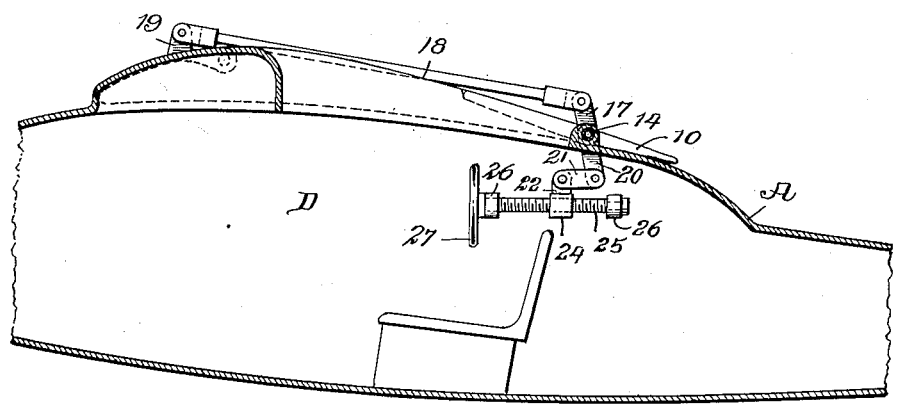
Figure 2 is a fragmentary enlarged longitudinal sectional view taken approximately on the line 2—2 of Figure 1.
Figure 3:
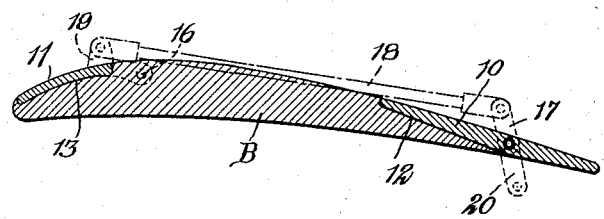
Figure 3 is a similar view taken approximately on the line 3—3 of Figure 1.
Figure 4:
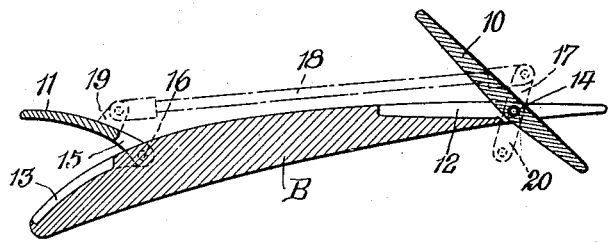
Figure 4 is a view similar to Figure 3, illustrating the device moved to its active position.
Figure 5:
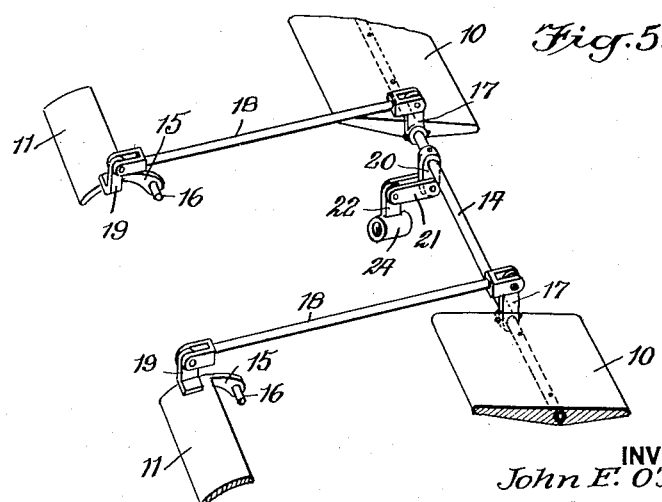
Figure 5 is a fragmentary diagrammatic perspective view illustrating the device and its control removed from the airplane.

In use and operation, assuming the shutters and valve members 11 and 10 to be in their normal inactive position illustrated in Figures 1, 2 and 3, the said shutters and valve members form a part of the wing contour. In descending or making a landing, with the plane nosing downward, the pilot by manipulating the wheel 27 in the proper direction feeds the threaded sleeve 24 forwardly, thereby turning the shaft 14 in a clockwise direction. This effects the movement of the valve members and shutters 11 to an angular position as illustrated in Figure 4, defining at the leading and entering edge of the wing, forwardly divergent pockets which offer a resistance to the descending movement of the plane. Air escapes from the pocket through the restricted outlet defined between the rear edge of the shutters and the upper surface of the wing, and said air pressure is conveyed rearwardly, where it enters the rearwardly converging pockets defined between the angularly disposed forward portions of the valve members 10 and the upper surface of the trailing edge of the wing. This obviously provides additional resistance to the descent of the plane and the air trapped in the rear pockets is deflected downwardly between the valve members 10 and the trailing edge of the wing, where it provides a reverse current to the air passing under the wing.

The device will also be found useful and may be brought into play when the wing is at a high angle of attack, to break up turbulence above the wing surface and the rear portions of the valve members 10 produce a camber which materially assists in controlling the roll of the craft and overcomes yawing.

While there has been illustrated and described a single and preferred embodiment of the invention, no limitation is intended to the precise structural details, and variations and modifications which properly fall within the scope of the claims may be resorted to when desired.

What is claimed is:

1. In an airplane, a wing structure having recessed portions forming part of the entering and trailing edges of the upper surfaces thereof, and shutters mounted to normally lie within said recessed portions and movable to various angular relations to provide co-operative head resistance surfaces.

2. In an airplane, a wing structure having recessed portions forming part of the entering and trailing edges of the upper surfaces thereof, and shutters mounted to normally lie within said recessed portions and manually movable in unison to various angular relations to provide co-operative head-resistance surfaces.

3. In an airplane, a wing structure having recessed portions forming part of the entering and trailing edges of the upper surfaces thereof, shutters mounted to normally lie within said recessed portions and manually movable in unison to various angular relations to provide co-operative head-resistance surfaces, and means controllable by the pilot for moving said shutters to their active and inactive positions.

4. In an airplane, a wing structure having recessed portions forming part of the entering and trailing edges of the upper surfaces thereof, shutters mounted to normally lie within said recessed portions, a connection between said shutters to cause the same to move in unison, a screw and nut actuated means, and linkage connecting said nut with the connection between said shutters.

5. In an airplane, a wing structure, means adjacent the entering edge movable from a normally inactive position within the confines of the wing contour to an open active angular relation diverging forwardly and providing a restricted rear outlet, and means adjacent the trailing edge including shutters mounted to normally lie in an inactive position within the confines of the wing contour and movable to an active angular relation with the forward portion extending above the wing surface and diverging forwardly and with the rear portion depending from the wing surface.

6. In an airplane, a wing structure, means adjacent the entering edge movable from a normally inactive position within the confines of the wing contour to an open active angular relation diverging forwardly and providing a restricted rear outlet, means adjacent the trailing edge including shutters mounted to normally lie in an inactive position within the confines of the wing contour and movable to an active angular relation with the forward portion extending above the wing surface and diverging forwardly and with the rear portion depending from the wing surface, and a connection between said shutters to cause the same to move in unison.

7. In an airplane, a wing structure, means adjacent the entering edge movable from a normally inactive position within the confines of the wing contour to an open active angular relation diverging forwardly and providing a restricted rear outlet, means adjacent the trailing edge including shutters mounted to normally lie in an inactive position within the confines of the wing contour and movable to an active angular relation with the forward portion extending above the wing surface and diverging forwardly and with the rear portion depending from the wing surface, a connection between said shutters to cause the same to move in unison, and mechanism controllable by the pilot for moving said shutters to their active and inactive positions.

JOHN F. O'MALLEY.